(12) United States Patent
Roller et al.

(10) Patent No.: US 8,403,192 B1
(45) Date of Patent: Mar. 26, 2013

(54) VEHICLE-MOUNTED REAL ESTATE SIGN CARRIER ASSEMBLY AND ASSOCIATED METHOD

(76) Inventors: Kenneth S. Roller, Riverside, CA (US); Joyce Y. Roller, Riverside, CA (US)

( * ) Notice: Subject to any disclaimer, the term of this patent is extended or adjusted under 35 U.S.C. 154(b) by 812 days.

(21) Appl. No.: 12/541,391

(22) Filed: Aug. 14, 2009

Related U.S. Application Data

(60) Provisional application No. 61/189,048, filed on Aug. 15, 2008.

(51) Int. Cl.
*B60R 9/00* (2006.01)
*B60R 9/06* (2006.01)

(52) U.S. Cl. ........ 224/526; 224/521; 224/534; 224/537; 40/591

(58) Field of Classification Search ............... 40/611.06, 40/611.05, 606.13, 606.03, 607.06, 591; 224/488, 495, 519–532, 533, 564, 537; 211/45, 211/50, 60.1
See application file for complete search history.

(56) References Cited

U.S. PATENT DOCUMENTS

| | | | |
|---|---|---|---|
| 1,752,591 A * | 4/1930 | Ellis | 40/592 |
| 2,214,302 A * | 9/1940 | Keller et al. | 40/591 |
| 2,581,762 A * | 1/1952 | Hesse | 40/653 |
| 2,816,377 A * | 12/1957 | Hastings | 40/591 |
| 3,158,302 A * | 11/1964 | Dickerson | 224/495 |
| 4,524,533 A * | 6/1985 | Still, Jr. | 40/607.06 |
| D294,307 S * | 2/1988 | Williams | D3/283 |
| 4,793,083 A * | 12/1988 | McDonald | 40/606.13 |
| 4,827,646 A | 5/1989 | Miller | |
| 5,328,066 A * | 7/1994 | Cappuccio et al. | 224/506 |
| 5,427,289 A * | 6/1995 | Ostor | 224/499 |
| 5,465,883 A * | 11/1995 | Woodward | 224/495 |
| 6,006,973 A * | 12/1999 | Belinky et al. | 224/510 |
| 6,019,266 A * | 2/2000 | Johnson | 224/534 |
| 7,156,273 B2 * | 1/2007 | Morris | 224/487 |
| 8,261,473 B2 * | 9/2012 | Bey et al. | 40/591 |
| 2003/0164436 A1 * | 9/2003 | Rooker | 248/441.1 |
| 2004/0232025 A1 * | 11/2004 | Lunde | 206/449 |
| 2006/0218835 A1 * | 10/2006 | Chafin | 40/611.05 |
| 2006/0265922 A1 * | 11/2006 | Shaffer, Jr. | 40/591 |
| 2007/0057000 A1 * | 3/2007 | Webster | 224/521 |
| 2007/0289183 A1 * | 12/2007 | Gonzalez | 40/611.06 |
| 2008/0257925 A1 * | 10/2008 | Brooks | 224/315 |
| 2009/0266857 A1 * | 10/2009 | Dennis | 224/489 |
| 2010/0251584 A1 * | 10/2010 | Bey et al. | 40/606.03 |

* cited by examiner

*Primary Examiner* — Justin Larson
*Assistant Examiner* — Corey Skurdal

(57) ABSTRACT

A vehicle-mounted real estate sign carrier assembly includes a U-shaped rack having front, back and side walls, and an L-shaped support rail. The support rail may be adapted to directly connect to a vehicle trailer hitch and locked with a pin when in use. A flexible strap directly mated to a top end of the support rail wraps about each of the stakes such that the real estate signs remain vertically stacked while the display screens are seated within the rack in a stable manner. The carrier assembly may transport multiple real estate signs to various locations, safely and easily by providing a quick-assembly, sturdy, compact and stable construction. Constructed with a low center of gravity the assembly allows a user to travel over bumpy and winding roads without the risk of dislodging his real estate signs from his vehicle.

15 Claims, 3 Drawing Sheets

VEHICLE-MOUNTED REAL ESTATE SIGN CARRIER ASSEMBLY AND ASSOCIATED METHOD

CROSS REFERENCE TO RELATED APPLICATIONS

This application claims the benefit of U.S. Provisional Application No. 61/189,048, filed Aug. 15, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION
TECHNICAL FIELD

This invention relates to carrier assemblies and, more particularly, to a vehicle-mounted real estate sign carrier assembly for providing a user with a means to safely and easily transport multiple signs to various locations.

PRIOR ART

For most of us, the most important financial investment we make is in our home, be it a house or a condominium. And when it comes to locating our new home, we have a variety of ways at our disposal, from newspaper classifieds to the real estate buyer's guides and the internet in which to locate a home. Still, none of these can compare to getting out in the car and driving around. This manner of shopping allows us to get a feel not only for the house or condo, but for the neighborhood as well—and the way we find our prospects is simply to follow the "For Sale" and "Open House" signs.

Real estate signs are every bit as important as print ads to buyers and sellers—perhaps more so to real estate agents, brokers, and Realtors. Real estate work can be a lucrative profession. A successful real estate professional must be outgoing and persuasive, highly motivated and highly organized—and a successful real estate professional, particularly in the residential market, must have a good number of listings, of properties to offer. And that means putting out a good number of signs.

Real estate signs are usually uniform in size, and easy to set up by, for example by sticking their stakes into the ground. The problem is not erecting the signs, but hauling them around. It is one thing to pack the back of a SUV with signs, the legs of which may be caked with dirt, and quite another to haul them in the back seat of a nice passenger sedan or the trunk of a sports car. The problem of transporting these real estate signs becomes more acute if a whole stack of these signs has to be put up in multiple locations.

Accordingly, a need remains for a vehicle-mounted real estate sign carrier assembly in order to overcome the above-noted shortcomings. The present invention satisfies such a need by providing an assembly that is convenient and easy to use, is durable yet lightweight in design, is versatile in its applications, and provides a user with a means to safely and easily transport multiple signs to various locations.

BRIEF SUMMARY OF THE INVENTION

In view of the foregoing background, it is therefore an object of the present invention to provide a vehicle-mounted real estate sign carrier assembly for removably coupled to an existing vehicle trailer hitch. These and other objects, features, and advantages of the invention are provided by a vehicle-mounted real estate sign carrier assembly.

In a preferred embodiment of the present invention, a vehicle-mounted real estate sign carrier assembly may include a plurality of real estate signs each having a rectilinear stake and a display screen connected thereto. The assembly may further include a U-shaped rack and an L-shaped support rail statically mated directly to a posterior side of the rack. The support rail may be adapted to directly connect to the existing vehicle trailer hitch and a flexible strap directly mated to a top end of the support rail and may be wrapped about each of the stakes such that the real estate signs remain vertically stacked while the display screens are seated within the rack.

Further, the real estate signs may be stored at an inverted position in the carrier assembly such that a combined center of mass of the real estate signs is located proximate to a bottom end of the support rail and thereby minimizes undesirable torque forces exerted against a top end of the support rail during vehicle transport. In this way the real estate signs may be securely placed in the carrier assembly without the risk of being dislodged while the vehicle is being driven over bumpy or winding roads.

In one embodiment, the rack may have an open box configuration including planar front and back walls registered parallel to each other. A bottom wall may in addition be intermediately mated directly to the front and back walls and a plurality of support bars directly joined to corresponding left and right sides of the front and back walls respectively. In this manner, the support bars are aligned parallel to the bottom wall and remain situated at the left and right sides of the front and back walls respectively such that the real estate signs are prohibited from being laterally displaced along the bottom wall during transport. The bottom wall may in addition be provided with a rectilinear slot with axially opposed ends situated proximate to the front and rear walls.

In one embodiment, the support rail may include a rectilinear horizontal rail emerging from the back wall and oriented perpendicular thereto. A rectilinear vertical rail may directly be mated to the horizontal rail and may be oriented parallel to the horizontal rail. The vertical rail may remain statically affixed to the back wall such that the rack remains at a vertically upright orientation during transport and such that the horizontal rail is registered parallel to the bottom wall and orthogonal to the vertical rail respectively. In addition, the horizontal rails are orientation proximate to the combined center of mass and thereby minimize operating torque forces exerted against the vertical rail during transport.

The vertical rail may extend upwardly and away from the horizontal rail such that a top end of the vertical rail terminates at a predetermined height above the rack for securely aligning the strap with corresponding top ends of the stakes respectively. This arrangement may minimize operating torque forces exerted against the vertical rail and ensure stability of the carrier assembly during transport.

In one embodiment, the horizontal rail may further be adapted to be removably interfitted within the existing vehicle trailer hitch while the real estate sign remain oriented at an inverted position within the rack during transport. Further, the top end of the vertical rail may be provided with a through-hole, such that the strap may be anchored to the through-hole and thereby maintains the stakes cinched together and vertically aligned parallel to the vertical rail while the real estate signs are situated at the inverted position within the rack during transport. This arrangement may ensure that the carrier assembly be maintained at a low center of gravity to allow ease of driving the vehicle during transport.

In another embodiment, the assembly may further include a quick-release pin removably interfitted through the horizontal rail and the existing vehicle trailer hitch such that the rack is adapted to maintain a fixed spatial distance from a rear bumper of the existing vehicle to thereby minimize operating torque forces exerted against the vertical rail during transport.

The vehicle-mounted real estate sign carrier assembly may further include a method for utilizing an assembly that is removably coupled to an existing vehicle trailer hitch. The method may include the chronological steps of providing a plurality of real estate signs each having a rectilinear stake and a display screen connected thereto; and providing a real estate sign carrier including a U-shaped rack, an L-shaped support rail that may be statically mated directly to a posterior side of the rack, and a flexible strap directly mated to a top end of the support rail. Additionally, the method may provide for the assembly to directly connect the support rail to the existing vehicle trailer hitch.

The method may further include the step of minimizing any undesirable torque forces exerted against a top end of the support rail during vehicle transport by additionally storing the real estate signs at an inverted position in the real estate sign carrier assembly such that a combined center of mass of real estate signs is located proximate to a bottom end of the support rail and additionally wrapping the strap about each of the stakes such that the real estate signs remain vertically stacked while the display screens are seated within the rack.

Such a method may ensure that the vehicle-mounted real estate sign carrier assembly remain sturdy and maintain a low center of gravity during transport.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1A:
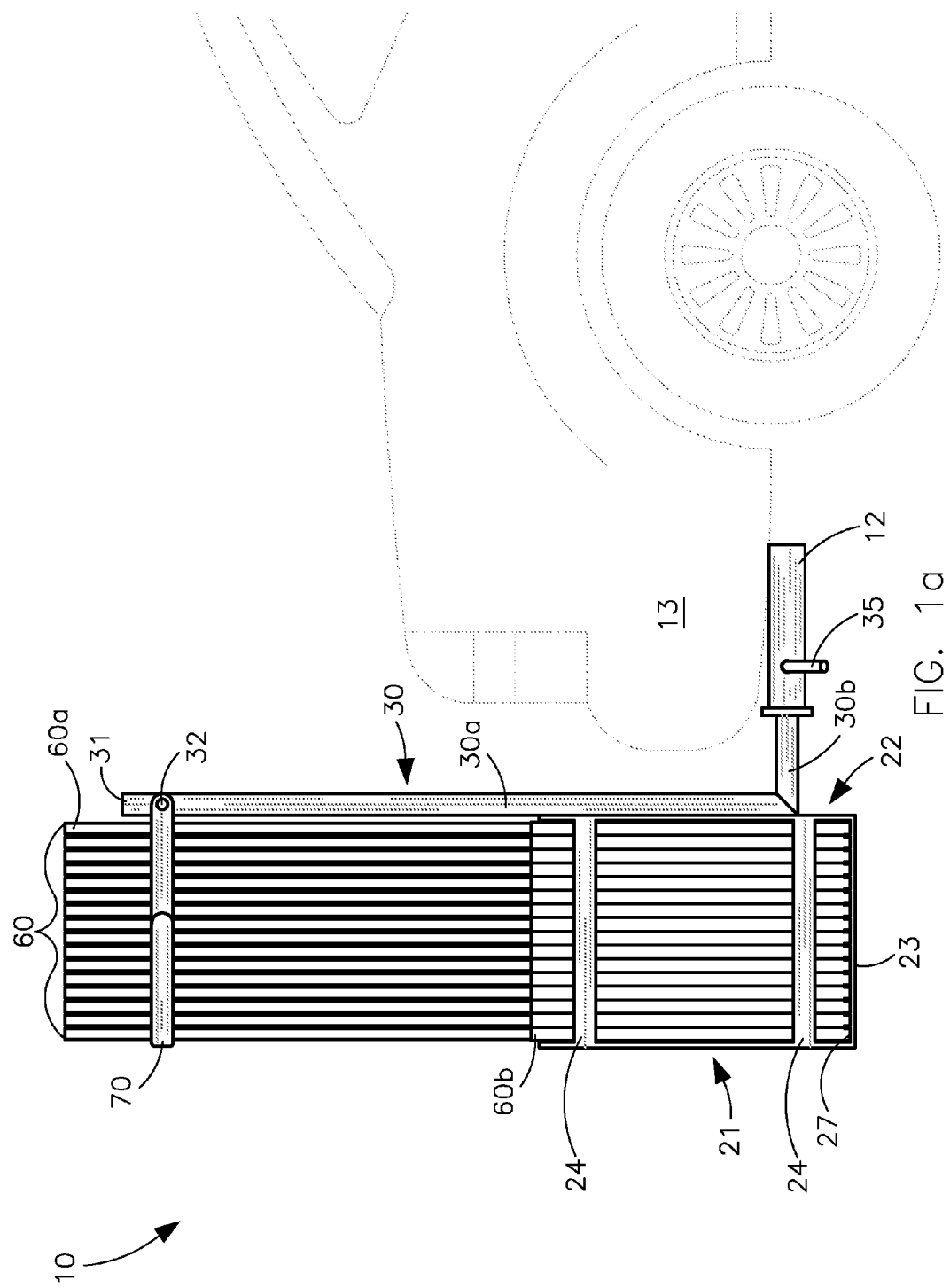
FIG. 1a is a right side view showing a vehicle-mounted real estate sign carrier assembly in loaded position in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1a-3 by the reference numeral 10 and is intended to provide a vehicle-mounted real estate sign carrier assembly. It should be understood that the vehicle-mounted real estate sign carrier assembly 10 may be used to safely and easily transport multiple real estate signs to various locations. Such an assembly 10 may include a plurality of real estate signs 60 each having a rectilinear stake 60a and a display screen 60b connected thereto. The assembly 10 may further include a U-shaped rack 20 and an L-shaped support rail 30 statically mated directly to a posterior side 22 of the rack 20.

Figure 1B:
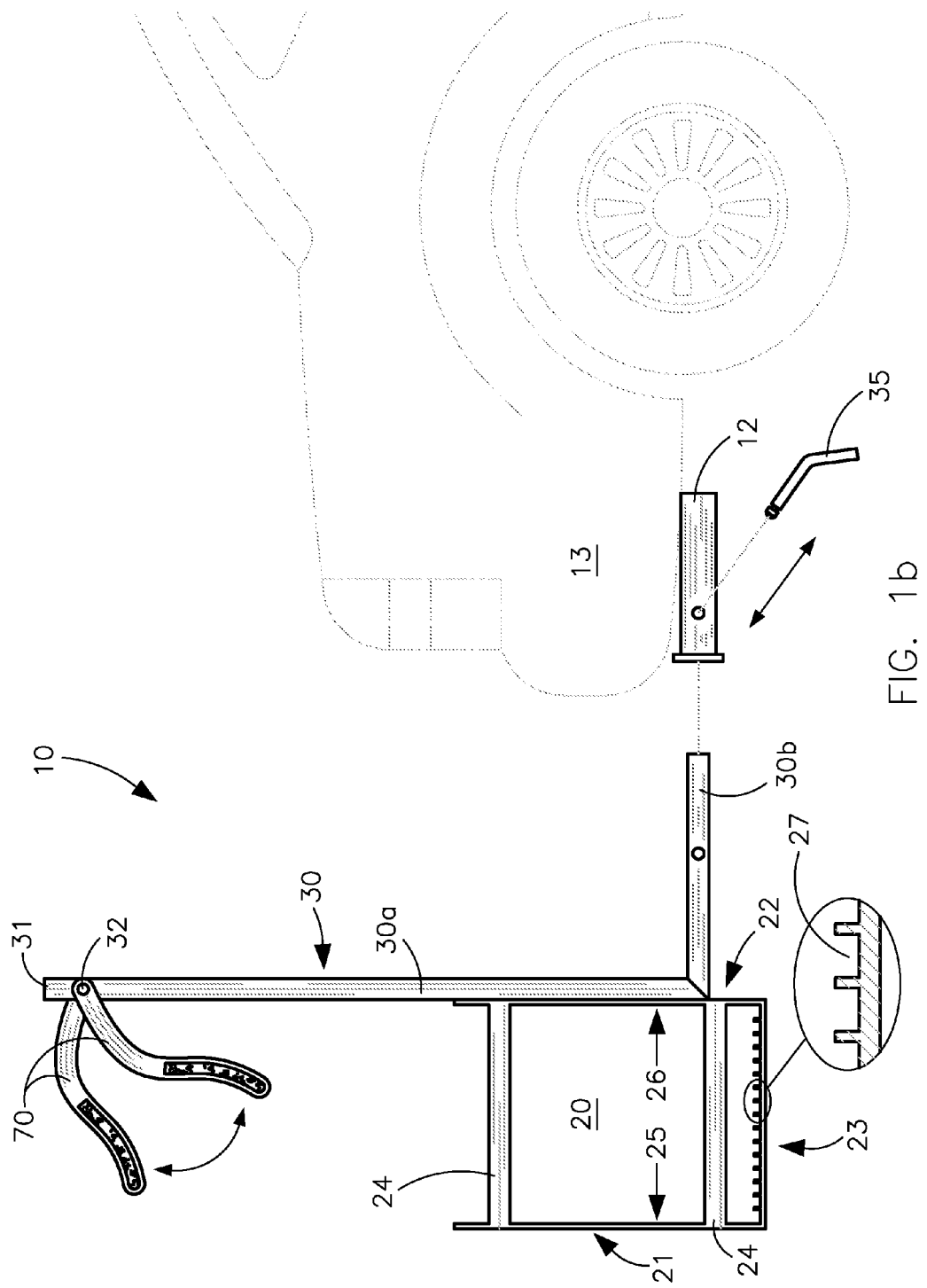
FIG. 1b is a right side view of the apparatus showing its assembly in relation to a vehicle.
Figure 3:
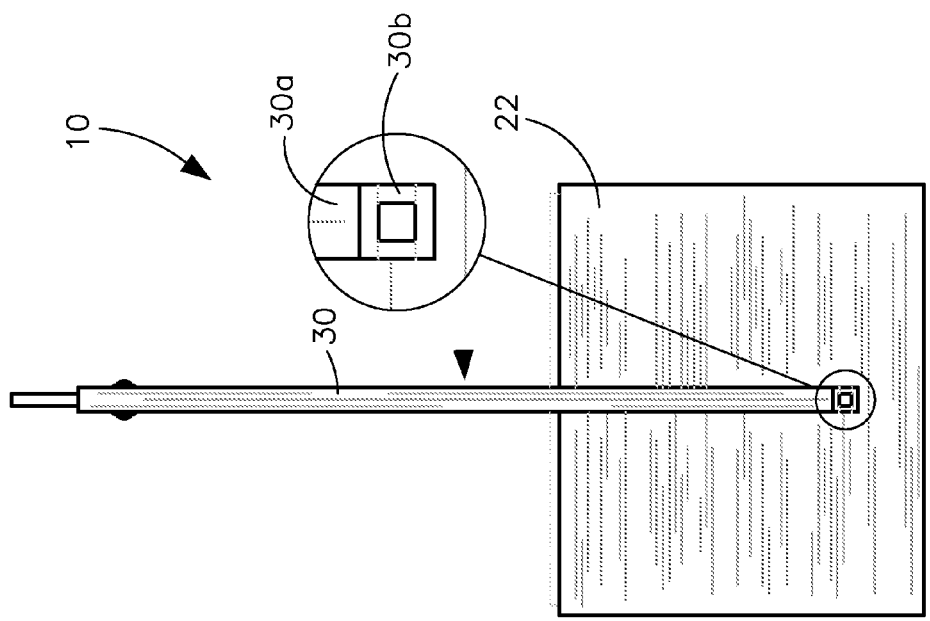
FIG. 3 is a rear elevational view of the apparatus.
Figure 2:
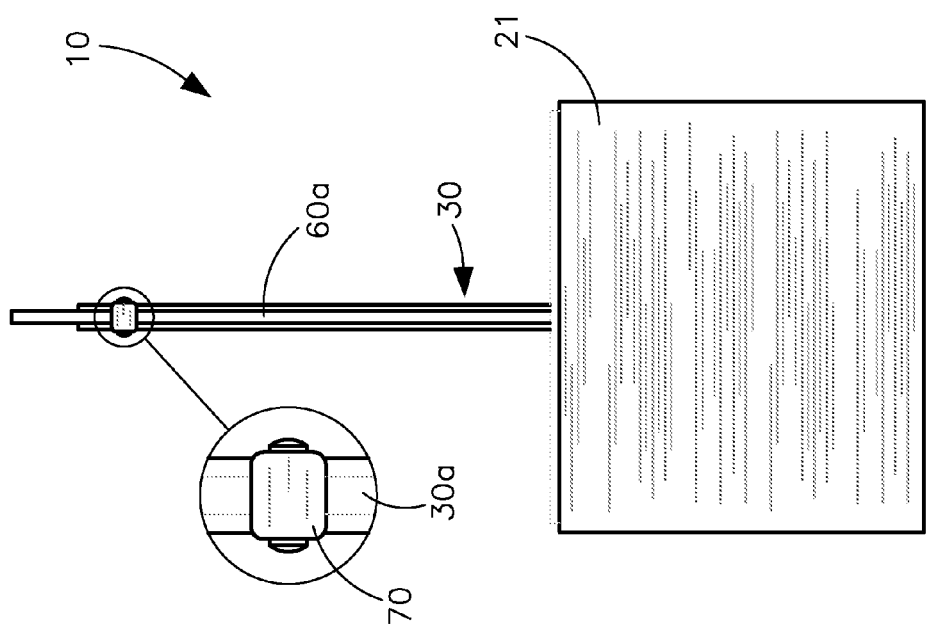
FIG. 2 is a front elevational view of the apparatus.

Referring to FIG. 1b, the support rail 30 may be adapted to directly connect to the existing vehicle trailer hitch 12. A flexible strap 70 may be directly mated to a top end 31 of the support rail 30 and may be wrapped about each of the stakes 60a such that the real estate signs 60 remain vertically stacked while the display screens 61 are seated within the rack 20. Such a flexible strap 70 may be formed from durable water-resistant or elastic material, well understood by one skilled in the art. The stakes 60 are securely maintained at a uniform arrangement while vertically aligned with the support rail 30. The flexible strap 70 provides the unexpected and unpredictable benefit of overcoming prior art shortcomings often resulting from vehicular transport of real estate signs 60. In particular, the flexible strap 70 allows the user to maintain the real estate signs 60 at the inverted position while minimizing undesirable shifting or displacement from operating forces exerted on the rack 20 and support rail 30 during extended travel procedures.

Referring to FIG. 1a, the real estate signs 60 may be stored at an inverted position in the carrier assembly 10 such that a combined center of mass of the real estate signs 60 is located proximate to a bottom end of the support rail 30. This arrangement advantageously minimizes undesirable torque forces exerted against a top end 31 of the support rail 30 during vehicle transport. In this way, the real estate signs 60 may be securely placed in the carrier assembly 10 without the risk of being dislodged while the vehicle 11 is being driven over bumpy or winding roads.

Again referring to FIG. 1b, 2, 3, the rack 20 may have an open box configuration including a planar front wall 21 and a planar back wall 22 registered parallel to each other. A bottom wall 23 may be intermediately mated directly to the front wall 21 and back wall 22. The rack may further include a plurality of support bars 24 directly joined to corresponding left side 25 and right side 26 of the front wall 21 and back wall 22 respectively. The support bars 24 are aligned parallel to the bottom wall 23 and remain structurally situated at the left side 25 and right side 26 of the front 21 and back wall 22 respectively. This structural configuration provides unexpected and unpredictable benefit of prohibiting the real estate signs 60 from being laterally displaced along the bottom wall 23 during transport. The bottom wall 23 may be provided with a rectilinear slot 27 with axially opposed ends situated proximate to the front 21 and rear walls 22. Such a slot 27 is advantageously beneficial for further permitting the user to quickly and effectively position the top end of the signs 60b into the slots 27 to additionally ensure minimal movements of the real estate signs 60 during travel. The combination of such claimed elements provides an unpredictable and unexpected result which is not rendered obvious by one skilled in the art.

Referring again to FIG. 1b, the support rail 30 may include a rectilinear horizontal rail 30b emerging from the back wall 22 and oriented perpendicular thereto. A rectilinear vertical rail 30a may directly be mated to the horizontal rail 30b and may be oriented parallel to the horizontal rail 30b. The vertical rail 30a may remain statically affixed to the back wall such that the rack 20 remains at a vertically upright orientation during transport and such that the horizontal rail 30b may be registered parallel to the bottom wall 23 and orthogonal to the vertical rail 30a respectively. In addition, the horizontal rails 30b are orientation proximate to the combined center of mass and thereby minimize operating torque forces exerted against the vertical rail 30a during transport. The vertical rail 30a may extend upwardly and away from the horizontal rail 30b such that a top end 31 of the vertical rail 30a terminates at a predetermined height above the rack 20 for securely aligning the strap 70 with corresponding top ends 31 of the stakes 60 respectively. This arrangement may minimize operating torque forces exerted against the vertical rail 30a and ensure stability of the carrier assembly 10 during transport.

Referring to FIG. 1a and FIG. 1b, the horizontal rail 30b may further be adapted to be removably interfitted within the existing vehicle trailer hitch 12 while the real estate sign 60 remain oriented at an inverted position within the rack 20 during transport. Further, the top end 31 of the vertical rail 30a may be provided with a through-hole 32, such that the strap 70 may be anchored to the through-hole 32 and thereby maintains the stakes 60 cinched together and vertically aligned parallel to the vertical rail 30a while the real estate signs 60 are situated at the inverted position within the rack 20 during transport. This feature of the invention provide an unexpected and unpredictable benefit to the user as it may ensure that the carrier assembly 10 be maintained at a low center of gravity to allow ease of driving the vehicle 11 during transport.

Referring to FIG. 1a and FIG. 1b, the assembly 10 may further include a quick-release pin 35 removably interfitted through the horizontal rail 30b and the existing vehicle trailer hitch 12 such that the rack 20 is adapted to maintain a fixed spatial distance from a rear bumper 13 of the existing vehicle 11 to thereby minimize operating torque forces exerted against the vertical rail 30a during transport.

The vehicle-mounted real estate sign carrier assembly 10 may further include a method for utilizing an assembly 10 that is removably coupled to an existing vehicle trailer hitch 12. The method may include the chronological steps of providing a plurality of real estate signs 60 each having a rectilinear stake 60 and a display screen 61 connected thereto; and providing a real estate sign carrier including a U-shaped rack 20, an L-shaped support rail 30 that may be statically mated directly to a posterior side 21 of the rack 20, and a flexible strap 70 directly mated to a top end 31 of the support rail 30. Additionally, the method may provide for the assembly 10 to directly connect the support rail 30 to the existing vehicle trailer hitch 12.

The method may further include the step of minimizing any undesirable torque forces exerted against a top end 31 of the support rail 30 during transport. This may be done by additionally storing the real estate signs 60 at an inverted position in the real estate sign carrier assembly 10 such that a combined center of mass of real estate signs 60 is located proximate to a bottom end of the support rail 30. The stability of the real estate signs during transport may be further ensured by additionally wrapping the strap 70 about each of the stakes 60 such that the real estate signs 60 remain vertically stacked while the display screens 61 are seated within the rack 20. Such a method may ensure that the vehicle 11-mounted real estate sign carrier assembly 10 remain sturdy and maintain a low center of gravity during transport.

The present invention, as claimed, provides the unexpected and unpredicted benefit of providing a user with a means to safely and easily transport multiple signs to various locations. By providing a carrier assembly in a quick-assembly, sturdy, compact and stable construction with a low center of gravity, the structure allows a user to easily travel over bumpy and winding roads without the risk of dislodging his real estate signs. The combination of such claimed elements provides an unpredictable and unexpected result which is not rendered obvious by one skilled in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle-mounted real estate sign carrier assembly for being removably coupled to an existing vehicle trailer hitch, said vehicle-mounted real estate sign carrier assembly comprising:
   a plurality of real estate signs each having a stake and a display screen connected thereto; and
   a real estate sign carrier comprising
      a rack,
      a support rail statically mated directly to a posterior side of said rack, said support rail being adapted to directly connect to the existing vehicle trailer hitch, and
      a strap directly mated to a top end of said support rail, said strap being wrapped about each of said stakes such that said real estate signs remain vertically stacked while said display screens are seated with said rack;
   wherein said real estate signs are stored at an inverted position in said real estate sign carrier such that a combined center of mass of real estate signs is located proximate to a bottom end of said support rail and thereby minimizes undesirable torque forces exerted against a top end of said support rail during vehicle transport.

2. The vehicle-mounted real estate sign carrier assembly of claim 1, wherein said rack comprises: an open box configuration including planar front and back walls registered parallel to each other;
a bottom wall intermediately mated directly to said front and back walls;
a plurality of support bars directly joined to corresponding left and right sides of said front and back walls respectively;
wherein said support bars are aligned parallel to said bottom wall and remain situated at said left and right sides of said front and rear walls such that said real estate signs are prohibited from being laterally displaced along said bottom wall during transport.

3. The vehicle-mounted real estate sign carrier assembly of claim 2, wherein said bottom wall is provided with a rectilinear slot having axially opposed ends situated proximate to said front and rear walls.

4. The vehicle-mounted real estate sign carrier assembly of claim 3, wherein said support rail comprises:
a rectilinear horizontal rail emerging from said rear wall and being oriented perpendicular thereto; and
a rectilinear vertical rail directly mated to said horizontal rail, said vertical rail being oriented parallel to said horizontal rail;
wherein said vertical rail remains statically affixed to said rear wall such that said rack remains at a vertically upright orientation during transport;
wherein said horizontal rail is registered parallel to said bottom wall and orthogonal to said vertical rail respectively;
wherein said horizontal rails is orientation proximate to said combined center of mass and thereby minimizes operating torque forces exerted against said vertical rail during transport.

5. The vehicle-mounted real estate sign carrier assembly of claim 4, wherein said vertical rail extends upwardly and away from said horizontal rail such that a top end of said vertical rail terminates at a predetermined height above said rack for securely aligning said strap with corresponding top ends of said stakes respectively to thereby minimize operating torque forces exerted against said vertical rail during transport;
wherein said horizontal rail is adapted to be removably interfitted within the existing vehicle trailer hitch while said real estate sign remain oriented at an inverted position within said rack during transport.

6. The vehicle-mounted real estate sign carrier assembly of claim 5, wherein said top end of said vertical rail is provided with a through-hole, said strap being anchored to said through-hole and thereby maintains said stakes cinched together and vertically aligned parallel to said vertical rail while said real estate signs are situated at said inverted position within said rack during transport.

7. The vehicle-mounted real estate sign carrier assembly of claim 6, further comprising a quick-release pin removably interfitted through said horizontal rail and the existing vehicle trailer hitch such that said rack is adapted to maintain a fixed spatial distance from a rear bumper of the existing vehicle to thereby minimize operating torque forces exerted against said vertical rail during transport.

8. A vehicle-mounted real estate sign carrier assembly for being removably coupled to an existing vehicle trailer hitch, said vehicle-mounted real estate sign carrier assembly comprising:
a plurality of real estate signs each having a rectilinear stake and a display screen connected thereto; and
a real estate sign carrier comprising
a U-shaped rack,
an L-shaped support rail statically mated directly to a posterior side of said rack, said support rail being adapted to directly connect to the existing vehicle trailer hitch, and
a flexible strap directly mated to a top end of said support rail, said strap being wrapped about each of said stakes such that said real estate signs remain vertically stacked while said display screens are seated with said rack;
wherein said real estate signs are stored at an inverted position in said real estate sign carrier such that a combined center of mass of real estate signs is located proximate to a bottom end of said support rail and thereby minimizes undesirable torque forces exerted against a top end of said support rail during vehicle transport.

9. The vehicle-mounted real estate sign carrier assembly of claim 8, wherein said rack comprises: an open box configuration including
planar front and back walls registered parallel to each other;
a bottom wall intermediately mated directly to said front and back walls;
a plurality of support bars directly joined to corresponding left and right sides of said front and back walls respectively;
wherein said support bars are aligned parallel to said bottom wall and remain situated at said left and right sides of said front and rear walls such that said real estate signs are prohibited from being laterally displaced along said bottom wall during transport.

10. The vehicle-mounted real estate sign carrier assembly of claim 9, wherein said bottom wall is provided with a rectilinear slot having axially opposed ends situated proximate to said front and rear walls.

11. The vehicle-mounted real estate sign carrier assembly of claim 10, wherein said support rail comprises:
a rectilinear horizontal rail emerging from said rear wall and being oriented perpendicular thereto; and
a rectilinear vertical rail directly mated to said horizontal rail, said vertical rail being oriented parallel to said horizontal rail;
wherein said vertical rail remains statically affixed to said rear wall such that said rack remains at a vertically upright orientation during transport;
wherein said horizontal rail is registered parallel to said bottom wall and orthogonal to said vertical rail respectively;
wherein said horizontal rails is orientation proximate to said combined center of mass and thereby minimizes operating torque forces exerted against said vertical rail during transport.

12. The vehicle-mounted real estate sign carrier assembly of claim 11, wherein said vertical rail extends upwardly and away from said horizontal rail such that a top end of said vertical rail terminates at a predetermined height above said rack for securely aligning said strap with corresponding top ends of said stakes respectively to thereby minimize operating torque forces exerted against said vertical rail during transport;
wherein said horizontal rail is adapted to be removably interfitted within the existing vehicle trailer hitch while said real estate sign remain oriented at an inverted position within said rack during transport.

13. The vehicle-mounted real estate sign carrier assembly of claim 12, wherein said top end of said vertical rail is provided with a through-hole, said strap being anchored to said through-hole and thereby maintains said stakes cinched together and vertically aligned parallel to said vertical rail while said real estate signs are situated at said inverted position within said rack during transport.

14. The vehicle-mounted real estate sign carrier assembly of claim 13, further comprising a quick-release pin removably interfitted through said horizontal rail and the existing vehicle trailer hitch such that said rack is adapted to maintain a fixed spatial distance from a rear bumper of the existing vehicle to thereby minimize operating torque forces exerted against said vertical rail during transport.

15. A method for utilizing a vehicle-mounted real estate sign carrier assembly that is removably coupled to an existing vehicle trailer hitch, said method comprising the chronological steps of:

providing a plurality of real estate signs each having a rectilinear stake and a display screen connected thereto;

providing a real estate sign carrier comprising a U-shaped rack, an L-shaped support rail statically mated directly to a posterior side of said rack, and a flexible strap directly mated to a top end of said support rail;

directly connecting said support rail to the existing vehicle trailer hitch;

minimizing undesirable torque forces exerted against a top end of said support rail during vehicle transport by storing said real estate signs at an inverted position in said real estate sign carrier such that a combined center of mass of real estate signs is located proximate to a bottom end of said support rail; and wrapping said strap about each of said stakes such that said real estate signs remain vertically stacked while said display screens are seated with said rack.

\* \* \* \* \*